(12) United States Patent
Lange

(10) Patent No.: US 9,416,319 B2
(45) Date of Patent: Aug. 16, 2016

(54) PROCESS FOR LIQUEFYING A CELLULOSIC MATERIAL

(71) Applicant: Shell Oil Company, Houston, TX (US)

(72) Inventor: Jean-Paul Lange, Amsterdam (NL)

(73) Assignee: Shell Oil Company, Houston, TX (US)

( * ) Notice: Subject to any disclaimer, the term of this patent is extended or adjusted under 35 U.S.C. 154(b) by 414 days.

(21) Appl. No.: 14/045,369

(22) Filed: Oct. 3, 2013

(65) Prior Publication Data

US 2014/0096438 A1 Apr. 10, 2014

(30) Foreign Application Priority Data

Oct. 8, 2012 (EP) .................................... 12187702

(51) Int. Cl.
| | | |
|---|---|---|
| *C07C 1/00* | (2006.01) | |
| *C10G 1/06* | (2006.01) | |
| *C08H 8/00* | (2010.01) | |
| *C10L 1/02* | (2006.01) | |
| *C10G 1/08* | (2006.01) | |
| *B01J 37/02* | (2006.01) | |
| *B01J 21/06* | (2006.01) | |
| *B01J 23/42* | (2006.01) | |
| *B01J 23/44* | (2006.01) | |
| *B01J 23/46* | (2006.01) | |
| *B01J 23/63* | (2006.01) | |
| *B01J 23/72* | (2006.01) | |
| *B01J 23/745* | (2006.01) | |
| *B01J 23/75* | (2006.01) | |
| *B01J 23/755* | (2006.01) | |
| *B01J 35/04* | (2006.01) | |
| *B01J 35/06* | (2006.01) | |
| *B01J 35/10* | (2006.01) | |
| *B01J 35/00* | (2006.01) | |

(52) U.S. Cl.
CPC ................ *C10G 1/06* (2013.01); *B01J 21/066* (2013.01); *B01J 23/42* (2013.01); *B01J 23/44* (2013.01); *B01J 23/462* (2013.01); *B01J 23/464* (2013.01); *B01J 23/468* (2013.01); *B01J 23/63* (2013.01); *B01J 23/72* (2013.01); *B01J 23/745* (2013.01); *B01J 23/75* (2013.01); *B01J 23/755* (2013.01); *B01J 35/04* (2013.01); *B01J 35/06* (2013.01); *B01J 35/1066* (2013.01); *B01J 35/1071* (2013.01); *B01J 35/1076* (2013.01); *B01J 37/0242* (2013.01); *B01J 37/0244* (2013.01); *C08H 8/00* (2013.01); *C10G 1/065* (2013.01); *C10G 1/086* (2013.01); *C10L 1/02* (2013.01); *B01J 35/0026* (2013.01); *C10G 2300/1014* (2013.01); *Y02E 50/13* (2013.01); *Y02E 50/16* (2013.01); *Y02P 30/20* (2015.11)

(58) Field of Classification Search
CPC ............ C10G 1/00; C10G 1/06; C10G 1/086; C10G 1/10; C10G 4/42; C10G 3/45; C10G 3/46; B01J 23/42; B01J 23/44; B01J 23/462; B01J 23/75; B01J 35/06; B01J 35/1071; Y02E 50/13; Y02E 50/14
USPC ............................. 585/240, 242; 44/605, 589
See application file for complete search history.

(56) References Cited

U.S. PATENT DOCUMENTS

| | | | | |
|---|---|---|---|---|
| 5,110,779 | A * | 5/1992 | Hucul .................... | B01J 23/40 502/185 |
| 5,338,441 | A * | 8/1994 | LeViness ............... | C10G 1/083 208/419 |
| 5,654,253 | A | 8/1997 | Hucul | |
| 6,087,455 | A * | 7/2000 | Lange .................... | C08C 19/02 525/328.6 |
| 8,841,495 | B2 * | 9/2014 | Marker .................. | B01J 8/1809 201/2.5 |
| 2010/0307050 | A1 | 12/2010 | Sen et al. | |
| 2010/0312027 | A1 * | 12/2010 | Tsurutani ............... | C10G 1/002 585/242 |
| 2011/0277378 | A1 * | 11/2011 | Von Hebel ............. | C08H 8/00 44/436 |
| 2011/0302824 | A1 * | 12/2011 | Von Hebel ............. | C08H 8/00 44/307 |
| 2012/0172579 | A1 * | 7/2012 | Qiao ...................... | C10G 1/06 530/500 |

FOREIGN PATENT DOCUMENTS

| | | |
|---|---|---|
| CN | 1403490 | 3/2003 |
| EP | 2011569 | 1/2009 |
| JP | H10298556 | 11/1998 |
| WO | 9819986 | 5/1998 |
| WO | WO 99/32529 * | 7/1999 |
| WO | 2005058856 | 6/2005 |
| WO | 2011141546 | 11/2011 |
| WO | 2012035410 | 3/2012 |

OTHER PUBLICATIONS

Carty et al.; "Monolithic Ceramics and Heterogenous Catalysts: Honeycombs and Foams"; Catalysts and Porous Solids, Current Opinion in Solid State & Materials Science; pp. 88-95; 1996.
Graves, K.; "Acid Catalyzed Degration of Cellulose in Alcohols"; Journal of Wood Chemistry and Technology; vol. 8 No. 1; pp. 121-134; 1988.

* cited by examiner

*Primary Examiner* — Nina Bhat

(57) ABSTRACT

A process for liquefying a cellulosic material to produce a liquefied product comprising contacting the cellulosic material with a hydrogenation catalyst a liquid medium; and a source of hydrogen. The hydrogenation catalyst comprises a hydrogenating metal or precursor thereof and a megaporous structure, wherein the megaporous structure comprises a porosity of at least 60% by volume and at least 30 volume % of the pore volume of the megaporous structure is present in megapores having a diameter of equal to or more than 1 micrometer.

18 Claims, No Drawings

PROCESS FOR LIQUEFYING A CELLULOSIC MATERIAL

RELATED APPLICATIONS

This application claims the benefit of European Patent Application 12187702.1, filed on Oct. 8, 2012, the disclosure of which is incorporated herein by reference in its entirety.

TECHNICAL FIELD

The present disclosure relates to a process for liquefying a cellulosic material, a process for producing a biofuel component from the cellulosic material, and a biofuel component obtainable by said process.

BACKGROUND

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of any prior art.

Cellulosic materials may be converted into valuable intermediates, which may be further processed into fuel components. As such, cellulosic materials are of considerable interest as feedstocks for the production of sustainable fuels and/or chemicals.

The combustible fuels and/or chemicals from biological sources, such as cellulosic materials, are often referred to as biofuels and/or biochemicals. The use of biological sources may allow for a more sustainable production of fuels and/or chemicals and more sustainable $CO_2$ emissions that may help meet global $CO_2$ emissions standards under the Kyoto protocol (i.e., may reduce greenhouse gas emissions).

Such biofuels can be used for blending with conventional petroleum derived fuels. Biofuels used for blending with conventional gasoline fuels include alcohols, in particular ethanol. Biofuels such as fatty acid methyl esters derived from rapeseed and palm oil can be blended with conventional diesel fuels. However, these biofuels are derived from edible feedstock and so compete with food production.

Biofuels derived from non-edible renewable feedstocks, such as cellulosic material, are becoming increasingly important, both economically and environmentally.

WO 2012/035410 describes biooils that can be derived, for example, from plants such as grasses, trees, wood chops, that can be dispersed in a hydrocarbon type liquid and subjected to a hydroreforming step. WO 2012/035410 indicates that such biooils may be obtained by thermochemical liquefaction, notably pyrolysis. It is indicated that a catalyst can be added to enhance the conversion in the so-called catalytic pyrolysis.

A process for liquefying a cellulosic material is described in WO 2011/141546 in which a cellulosic material such as wood is liquefied by contacting it simultaneously with an acid catalyst, water, a polar co-solvent, a source of hydrogen and a hydrogenation catalyst. The hydrogenation catalyst can comprise a heterogeneous or homogeneous catalyst. WO 2011/141546 indicates that if the hydrogenation catalyst is a heterogeneous catalyst, the catalyst preferably comprises a hydrogenation metal supported on a carrier. The heterogeneous catalyst and/or carrier may have any suitable form including the form of a mesoporous powder, granules or extrudates or a megaporous structure such as a foam, honeycomb, mesh or cloth. The heterogeneous catalyst may be present in a liquefaction reactor comprised in a fixed bed or ebullated bed or suspended slurry.

In liquefaction processes, deep removal of catalyst particles and/or catalyst fines from the liquefied product can add significantly to the costs of such processes. Moreover, the liquefied product may to some extent still remain contaminated with catalyst particles and/or fines, affecting its quality. The use of megaporous catalysts as described in WO 2011/141546 may reduce the need for such deep removal and may reduce the contamination with catalyst particles and/or fines in the liquefied product.

However, in order to obtain an economically interesting process, the degree of liquefaction may need to be further improved.

It would be an advancement in the art to provide a liquefaction process that allows one to reduce and/or avoid contamination of the liquefied product with catalyst particles whilst still obtaining a good degree of liquefaction of the cellulosic material.

Hence, there remains a continuing need for the development of improved processes for liquefying cellulosic material to produce liquefied products, especially fuel components and/or fuel component precursors for use in the preparation of biofuels.

SUMMARY

Embodiments provided herein can address the above-mentioned drawbacks. For example, according to one embodiment, there is provided a process for liquefying a cellulosic material to produce a liquefied product. The process comprises contacting the cellulosic material with a hydrogenation catalyst, a liquid medium; and a source of hydrogen. The hydrogenation catalyst comprises a hydrogenating metal or precursor thereof. The hydrogenation catalyst further comprises a megaporous structure, where the megaporous structure comprises a porosity of at least 60% by volume. At least 30 volume % of the pore volume of the megaporous structure is present in megapores having a diameter of equal to or more than 1 micrometer.

In certain embodiment, the process may advantageously allow for an effective recovery of the catalyst, resulting in an improved quality of the liquefied product, whilst additionally allowing for an attractive degree of liquefaction of the cellulosic material.

In some embodiments, further a high degree of saturation of the produced monomeric and/or oligomeric compounds may be obtained, which may result in improved chemical stability and/or an increased heating value of the product and/or an improved processibility for further upgrading to biofuels.

In another, there is provided a process for producing a biofuel component from a cellulosic material, which process comprises a) contacting the cellulosic material with the hydrogenation catalyst, a liquid medium, and a source of hydrogen as described above to produce a liquefied product; b) converting at least part of the liquefied product to produce a fuel component and/or fuel component precursor; and c) using the fuel component and/or the fuel component precursor in the preparation of a fuel.

Other advantages and features of embodiments of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

DETAILED DESCRIPTION

The present disclosure provides processes for liquefying a cellulosic material to produce a liquefied product. The term liquefying is herein preferably understood to refer to the conversion of a solid material, such as cellulosic material, into one or more liquefied products. Liquefying is sometimes also referred to as liquefaction. A process for liquefying a solid material, such as a cellulosic material, is sometimes also referred to as a liquefaction process. A liquefaction process carried out with hydrogen is also sometimes referred to as a hydroliquefaction process.

The term liquefied product is herein understood to refer to a product that is liquid at ambient temperature (about 20 degrees C.) and pressure (about 0.1 MegaPascal (MPa) corresponding to 1 bar absolute) and/or a product that can be converted into a liquid at ambient temperature and pressure by melting (for example by applying heat) or dissolving in a solvent. Preferably the liquefied product is liquid at ambient temperature (about 20 degrees C.) and pressure (about 0.1 MegaPascal (MPa) corresponding to 1 bar absolute). Liquefaction of a cellulosic material can comprise cleavage of covalent linkages in that cellulosic material. For example, liquefaction of lignocellulosic material can comprise cleavage of covalent linkages in the cellulose, hemicellulose and lignin present and/or cleavage of covalent linkages between lignin, hemicelluloses and/or cellulose.

As used herein, cellulosic material refers to a material containing cellulose. Preferably the cellulosic material is a lignocellulosic material. A lignocellulosic material comprises lignin, cellulose and optionally hemicellulose. Any suitable cellulose-containing material may be used in the processes according to the present invention. The cellulosic material for use in embodiments provided herein may be obtained from a variety of plants and plant materials including agricultural wastes, forestry wastes, sugar processing residues and/or mixtures thereof. Examples of suitable cellulose-containing materials include agricultural wastes such as corn stover, soybean stover, corn cobs, rice straw, rice hulls, oat hulls, corn fiber, cereal straws such as wheat, barley, rye and oat straw; grasses; forestry products such as wood and wood-related materials such as sawdust; waste paper; sugar processing residues such as bagasse and beet pulp; or mixtures thereof.

Before use, in certain embodiments, the cellulosic material is preferably processed into small particles in order to facilitate liquefaction. Preferably, the cellulosic material is processed into particles with an average particle size of about 0.5 to 30 millimeter (mm). If the cellulosic material is a lignocellulosic material, it may also be subjected to a pretreatment to remove and/or degrade lignin and/or hemicelluloses. Examples of such pretreatments include fractionation, pulping and torrefaction processes.

In embodiments of the invention, suitably, the cellulosic material may be simultaneously contacted with a hydrogenation catalyst, a liquid medium and a source of hydrogen. Preferably, in one embodiment, the cellulosic material is dissolved or dispersed within the liquid medium where it is contacted with the source of hydrogen in the presence of the hydrogenation catalyst. More preferably, in one embodiment, the processes comprise contacting the cellulosic material in a liquid medium with the hydrogenation catalyst in a fixed bed.

In one embodiment, the hydrogenation catalyst comprises a hydrogenating metal or precursor thereof, which hydrogenation catalyst comprises a megaporous structure, wherein the megaporous structure comprises a porosity of at least 60% by volume and at least 30 volume % of the pore volume of the megaporous structure is present in megapores having a diameter of equal to or more than 1 micrometer.

Unless indicated otherwise herein, the porosity refers to the porosity of the megaporous structure. Further, porosity may herein be understood to refer to the percentage of the total volume of the megaporous structure that is present as pore volume. That is, it may be understood to refer to the fraction empty or void space within the megaporous structure on the basis of the total volume of the megaporous structure. Porosity may for example be measured by ASTM C830, including a Standard Test Method for Apparent Porosit.

In one embodiment, the megaporous structure can, in addition to the megapores, contain macropores, mesopores, and/or micropores.

The term megapore is herein preferably understood to refer to a pore with a pore diameter of equal to or more than 1 micrometer. A micrometer may herein also be referred to as a micron. Such a pore diameter can suitably be measured by means of a visual microscope or electronic microscope.

The term macropore is herein preferably understood to refer to a pore with a pore diameter in the range from equal to or more than 50 nanometers to less than 1 micrometer.

The term mesopore is herein preferably understood to refer to a pore with a pore diameter in the range from equal to or more than 2 nanometers to less than 50 nanometers.

The term micropore is herein preferably understood to refer to a pore with a pore diameter of less than 2 nanometers.

The wording pore diameter is herein also sometimes referred to as pore size or just diameter.

The pore volume and/or pore volume distribution may suitably be measured by any method known to the person skilled in the art to be suitable therefore. Depending on the specific material, for example mercury intrusion porosimetry or Nitrogen ($N_2$) adsorption may be used to determine pore volume.

For example, ASTM D4284, "the Standard Test Method for Determining Pore Volume Distribution of Catalysts and Catalyst Carriers by Mercury Intrusion Porosimetry" may be used to measure pore volume and pore volume distribution for pore diameters in the range from 0.003 to 100 micrometer. Unless indicated otherwise herein, ASTM D4284 may therefore be most suitable for determining the above pore volumes and pore volume distributions for megapores and macropores. ASTM D4641, "the Standard Practice for Calculation of Pore Size Distributions of Catalysts and Catalyst Carriers from Nitrogen Desorption Isotherms" may be more suitable for measuring pore volume and pore volume distributions for pore diameters in the range from 1.5 to 100 nanometer. Unless indicated otherwise herein, ASTM D4641 may therefore be most suitable for determining the above pore volumes and pore volume distributions for micropores and mesopores.

Preferably at least about 50 volume %, more preferably at least about 70 volume %, still more preferably at least about 80 volume %, even still more preferably at least about 85 volume %, and most preferably at least about 90 volume % of the pore volume of the megaporous structure is present in megapores having a diameter of equal to or more than about 1 micrometer. Suitably, in the range of about from 50 to 98 volume % of the pore volume of the megaporous structure is present in megapores having a diameter of equal to or more than about 1 micrometer, more suitably in the range of about from 70 to 95 volume % of the pore volume of the megaporous structure is present in megapores having a diameter of equal to or more than about 1 micrometer.

More preferably the megaporous structure comprises a porosity of at least about 60% by volume; and at least about 30 volume %, more preferably at least about 50 volume %, even still more preferably at least about 80 volume %, and most preferably at least about 90 volume %, of the pore volume of the megaporous structure is present in megapores having a diameter of at least about 5 micrometer, more preferably of at least about 10 micrometer. Suitably, the megaporous structure comprises a porosity of at least about 60% by volume; and at least about 30 volume %, more preferably at least about 50 volume %, even still more preferably at least about 80 volume %, and most preferably at least about 90 volume %, of the pore volume of the megaporous structure is present in megapores having a diameter in the range of from about 5 to 5000 micrometer, preferably in the range of from about 10 to 1000 micrometer.

The megaporous structure has preferably a porosity of at least about 70% by volume, more preferably at least about 80% by volume, still more preferably at least about 85% by volume and most preferably at least about 90% by volume. Suitably, the megaporous structure has a porosity in the range of from about 70 to 98% by volume, more preferably in the range of from about 80 to 95% by volume.

In one embodiment, the megaporous structure of the hydrogenation catalyst may for example comprise a foam, a honeycomb or a sheet of carbon fibers.

In one preferred embodiment, the megaporous structure of the hydrogenation catalyst comprises one or more sheets of carbon fibers. An example of such a sheet of carbon fibers is a graphite sheet. In a preferred embodiment, such hydrogenation catalyst comprises a hydrogenating metal and/or precursor thereof carried on a sheet of carbon fibers (such as for example a graphite sheet), the sheet of carbon fibers having a porosity of at least about 60% by volume. Suitably, the sheet of carbon fibers comprises one or more pores with a pore size of at least about 1 micrometer. Preferably, at least about 30 volume % of the pore volume of the sheet of carbon fibers is present in megapores having a pore size of at least 1 micrometer. It has been found that such a hydrogenation catalyst allows one to achieve an improved degree of liquefaction.

In another preferred embodiment, the hydrogenation catalyst is in the form of a megaporous structure which comprises a catalytic layer, which catalytic layer has a thickness which is less than about 25% of the average megapore diameter of the megaporous structure. The catalytic layer may suitably comprise the hydrogenating metal and/or precursor thereof. In one embodiment, the catalytic layer may suitably be deposited onto the megaporous structure. Preferably, the catalytic layer has a thickness in the range from about 0.001 to 100 micrometers, more preferably in the range from about 0.01 to 50 micrometers. More preferably the catalytic layer may have a thickness in the range of from about 0.1 to 10 micrometers, and most preferably in the range of from about 0.2 to 2 micrometers.

Preferably, the catalytic layer has a thickness which is less than about 15% of the average megapore diameter of the megaporous structure, more preferably less than about 10% of the average megapore diameter of the megaporous structure. The catalytic layer can be porous or non-porous.

Preferably, the megaporous structure comprises a porosity of at least about 70% by volume and at least about 30 volume %, more preferably at least about 50 volume %, even still more preferably at least about 80 volume %, and most preferably at least about 90 volume %, of the pore volume is present in megapores with a diameter of at least about 5 micrometer, and preferably the megaporous structure comprises a catalytic layer of which the thickness is less than about 15% of the average megapore diameter of the megaporous structure.

More preferably, the megaporous structure comprises a porosity of at least about 80% by volume and at least about 30 volume %, more preferably at least about 50 volume %, even still more preferably at least about 80 volume %, and most preferably at least about 90 volume %, of the pore volume is present in megapores having a diameter of at least about 10 micrometer, more preferably at least about 20 micrometer, and preferably the megaporous structure comprises a catalytic layer of which the thickness is less than about 10% of the average megapore diameter of the megaporous structure.

In one embodiment, the megaporous structure can consist of the hydrogenation metal or the hydrogenation metal can directly be deposited onto the megaporous structure.

In a preferred embodiment the hydrogenation catalyst comprises a megaporous structure comprising a porosity of at least about 60% by volume and comprising at least about 30 volume %, more preferably at least about 50 volume %, even still more preferably at least about 80 volume %, and most preferably at least about 90 volume %, of the pore volume of the megaporous structure in megapores having a diameter of equal to or more than about 1 micrometer; a non-megaporous, for example a mesoporous, catalytic layer comprising equal to or more than about 70 volume % of the pore volume in pores having a diameter of less than about 1 micrometer, which non-megaporous catalytic layer is deposited onto the megaporous structure, and which non-megaporous catalytic layer comprises the hydrogenating metal and/or precursor thereof.

In another preferred embodiment, the non-megaporous catalytic layer is a mesoporous catalytic layer comprising equal to or more than about 50 volume %, more preferably equal to or more than about 70 volume % of the pore volume in pores having a diameter in the range from equal to or more than about 2 nanometers to less than about 50 nanometers.

The mesoporous catalytic layer may comprise a mesoporous carrier layer supporting the hydrogenation metal and/or precursor thereof, or the mesoporous catalytic layer may consist of hydrogenation metal and/or precursor thereof itself. Such mesoporous catalytic layer or mesoporous carrier layer is suitably deposited onto the megaporous structure. Hence, the hydrogenation catalyst may comprise a mesoporous carrier layer with a supported metal, which carrier layer is deposited onto the megaporous structure; or the hydrogenation catalyst may comprise an unsupported metal directly deposited onto the megaporous structure.

In one embodiment, the mesopores of any mesoporous catalytic layer respectively any mesoporous carrier layer are smaller than about 1 micrometer, preferably smaller than 0.1 micrometer, and most preferably smaller than about 0.05 micrometer. Preferably, the catalytic layer may be in the form of one or more atomic layers of hydrogenating metal, which hydrogenation metal is directly applied onto the megaporous structure.

The catalytic layer may comprise a mesoporous carrier layer onto which the hydrogenating metal can be deposited or into which the hydrogenation metal can be incorporated. Such mesoporous carrier layer can be deposited onto the megaporous structure by means of a coating, wash coat or like layer of porous material introduced by techniques as known in the art. For example, in "Monoliths in Heterogeneous Catalysts," Cybulski et al, Catal. Rev.- Sci. Eng., vol. 36 (2), pages 179-270 (1994), techniques are disclosed for the coating of foams with oxide layers which can be used to increase surface area or to alter surface compositions. Wash coating is preferably with a layer of alumina, more preferably with an alumina sol.

Preferred techniques for impregnation include for example dipping, painting, spraying, immersing and/or applying measured droplets of a suspension or solution of the catalytically active metal and/or precursor thereof. Subsequent steps may include drying in hot air and/or optional calcining. Preferably the impregnation, drying and optional calcining are carried out in a manner such that a uniform impregnation is achieved. Preferably impregnation and/or drying is carried out in the absence of distorting gravitation and/or capillary effects during drying, which might provide an undesired gradient or total content of the impregnated metal. For example, the megaporous structure may be rotated or suspended in manner that contact with any other objects does not encourage meniscus or capillary effects.

The mesoporous carrier layer may comprise a refractory oxide, such as for example alumina as mentioned above. Alternatively, the mesoporous carrier layer can consist of porous carbonaceous materials such as carbon nanofibers that are deposited onto the megaporous structure by techniques known to the art, for instance as described by K. P. De Jong, J. Geus, Catal. Rev. Sci. Eng. vol. 42 (2000) pages 481-510 or N. Jarrah, F. Li, J. G. van Ommen, L. Lefferts, J. Mater. Chem. vol. 15 (2005) pages 1946-1953.

Examples of suitable materials from which the megaporous structure can be made include metals (for example steel and/or the hydrogenating metal itself such as cobalt, nickel or copper); carbon; inorganic metal oxides (also referred to as refractory oxides), such as silica, alumina, titania, zirconia and mixtures thereof (that is inorganic metal oxides comprising at least one cation, or at least two cations, being a binary oxide, ternary oxide, etc.); metal carbides; and metal nitrides and the like.

The at least one cation of an inorganic metal oxide is preferably selected from Groups 2 to 6 and 12 to 15 of the Periodic Table of the Elements and the lanthanides.

A mixed oxide may comprise two or more cations in any desired amounts, preferably each independently in an amount of about 1 to 99% by weight of the total sum of all cations, more preferably two cations in an amount of about 1 to 50% and about 50 to 99% by weight respectively, most preferably in an amount of about 15 to 25% and about 85 to 75% by weight respectively. The oxide is suitably prepared by techniques as known in the art or is commercially available.

One of the advantages of the present invention is that the megaporous structure of the catalyst is accessible for molecules with a low diffusion coefficient, allowing for an improved liquefaction degree of the cellulosic material. Thus, it will be appreciated that the megapores referred to in respect of the present invention have a diameter of the order of magnitude of at least about 1 micrometer, preferably about 5 to 5000 micrometers and most preferably of about 10 to 1000 micrometers. Preferably, the diameter of the megapores may suitably be considered to refer to the nominal diameter of such a megapore. These megapores are to be contrasted with macropores, mesopores and micropores which may be present in the megaporous structure material itself, which may be porous, and are smaller than about 1 micrometer, as explained before. Pore size may be selected according to the cellulosic material to be liquefied.

Useful megaporous structures can be found in Chapter 3 by M. V. Twigg and D. E. Webster, titled "etal and coated-metal catalysts" (pages 71-88); and in the chapter by J. P. Stringaro, P. Collins and O. Bailer, titled "open cross-flow-channel catalysts and catalyst supports" in the book on "Structured Catalysts and Reactors," edited by A. Cybulski and J. A. Moulin (1998); and further in the article titled "Monoliths in Heterogenous Catalysts," by Cybulski et al, published in Catal. Rev.- Sci. Eng., vol. 36 (2), pages 179-270 (1994); and the article titled "Monolithic Ceramics and Heterogenous Catalysts: Honeycombs and Foams," by Carty and Lednor, published in Solid Catalysts and Porous Solids, Current Opinion in Solid State & Materials Science (1996), vol. 1, pages 88-95, with extensive reviews of suitable support materials, together with methods for the preparation thereof, the contents of which are incorporated herein by reference.

Suitable megaporous structures for use in the present processes are available commercially.

In one embodiment, the megaporous structure of the hydrogenation catalyst can be a foam, preferably a monolitic foam, a honeycomb or an assembly of stacked or rolled flat or corrugated plates, foils or gauzes, including woven gauzes and knitted gauzes, and other structures having high mass transport characteristics.

The pore structure of the megapores in the megaporous structure may be one-dimensional, two-dimensional or three-dimensional. Suitable examples of such one dimensional pore structures include honeycombs and corrugated foils or plates. Suitable examples of such two-dimensional pore structures include, for instance, megaporous structures that comprises two or more corrugated foils or plates that are transversely arranged with respect to each other, and thus have a transversal structure. Suitable examples of such three-dimensional pore structures include foams, stacked or rolled gauzes, including woven and knitted gauzes, perforated stacked or rolled foils or plates and stacked plates that are arranged in an open cross-flow structure.

The body structure of the megaporous structure may be one-dimensional, two-dimensional or three-dimensional. Suitable examples of such one dimensional body structures include wires as used in gauzes and folded wires (In case of folded wires, the pore volume may be located between the wires). Suitable examples of such two-dimensional body structures include for instance gauzes, plates and foils. Suitable examples of such three-dimensional body structures include foams, honeycombs, spheres and cylinders, as well as stacking of two-dimensional bodies that are fixed together by any means such as welding. Suitable megaporous structures also include millimeter-size catalyst bodies such as spheres, cylinders and polylobes, that have been prepared such as to contain megapores.

The hydrogenation metal can be any hydrogenation metal known to be suitable for hydrogenation reactions. Preferably the hydrogenation metal is selected from the group consisting of iron, cobalt, nickel, copper ruthenium, rhodium, palladium, iridium, platinum, gold, and mixtures thereof.

Techniques for loading/depositing the hydrogenation metals on porous structures are well known in the art, for example impregnation, ion-exchange, precipitation, deposition/precipitation, chemical vapor deposition or (on a metal structure) electrolytic deposition. A most suitable technique for depositing the metal on the megaporous structure is impregnation. Preferably, impregnation of the megaporous structure is with a solution of a compound of the catalytically active metal, followed by drying and optional calcining the resultant material. Where it is desired to introduce a mixture of metals or a mixture with additional metals as herein before defined, the impregnating solution may be a mixture of solutions of the respective metal salts combine in suitable amount for co-impregnation. Alternatively impregnation may be sequential, with first stage impregnation, drying and calcining with the catalytically active metal solution, and second stage impregnation of another metal which it is desired to impregnate, or vice versa. In this way, additional catalyst components can for instance subsequently be deposited onto the megaporous structure, incorporated into the mesoporous wall of the megaporous structure or incorporated into the mesoporous carrier layer deposited onto the megaporous structure.

The hydrogenating metal is suitably impregnated in the form of its oxide, or is converted to the oxide during the calcining step. Preferably the metal oxide is converted to its catalytically active form by reducing to the metal, using techniques as known in the art.

The liquid medium used for liquefaction process (i.e. the process for liquefying the cellulosic material) may comprise water and/or an organic solvent. In a preferred embodiment the liquid medium is a solvent mixture as described in WO 2011/141546, wherein the solvent mixture contains water and a co-solvent, which co-solvent may comprise one or more polar solvents. Most preferably at least part of the liquefaction product is used as a solvent. In an especially preferred embodiment the liquid medium comprises water and/or hydrocarbons.

The cellulosic material and the liquid medium are preferably mixed in a solvent mixture-to-cellulosic material ratio of 2:1 to 20:1 by weight, more preferably in a liquid medium-to-cellulosic material ratio of 3:1 to 15:1 by weight and most preferably in a liquid medium-to-cellulosic material ratio of 4:1 to 10:1 by weight.

The source of hydrogen may be any source of hydrogen known to be suitable for hydrogenation purposes. It may for example include hydrogen gas, but also a hydrogen donor, such as for example formic acid. Preferably, the source of hydrogen is a hydrogen gas. Such a hydrogen gas can be applied in the processes of the invention at a partial hydrogen pressure that preferably lies in the range from about 0.2 to 20 MegaPascal, more preferably in the range from about 1 to 17 MegaPascal, and most preferably in the range from about 3 to 15 MegaPascal (MPa). A hydrogen gas can be supplied to a liquefaction reactor co-currently, cross-currently or counter-currently to the cellulosic material.

Embodiments provided by the present disclosure can be carried out at any total pressure known to be suitable for liquefaction processes. The process can be carried out under a total pressure that preferably lies in the range from about 0.2 to 20 MegaPascal, more preferably in the range from about 1 to 17 MegaPascal, and most preferably in the range from about 3 to 15 MegaPascal.

Embodiments provided by the present disclosure can be carried out at any temperature known to be suitable for liquefaction processes. The process according to the invention is preferably carried out at a temperature in the range of equal to or more than about 50 degrees C. to equal to or less than about 350 degrees C., more preferably at a temperature in the range of equal to or more than about 100 degrees C. to equal to or less than about 300 degrees C., and most preferably at a temperature in the range of equal to or more than about 150 degrees C. to equal to or less than about 250 degrees C.

Embodiments provided by the present disclosure can be carried out batch-wise, semi-batch wise or, more preferably, continuously. In a preferred embodiment the liquefaction process is carried out in one or more fixed beds. Such one or more fixed beds may suitably contain the hydrogenation catalyst.

Other preferences are as described in WO 2011/141546. For example, embodiments provided by the present disclosure may be carried out in the presence of an additional acid catalyst as described in WO 2011/141546. That is, in a preferred embodiment, the cellulosic material is also contacted with an additional acid catalyst. More preferably the liquefaction process is thus a process for liquefying a cellulosic material to produce a liquefied product, which process comprises contacting the cellulosic material simultaneously with a hydrogenation catalyst comprising a hydrogenating metal or precursor thereof, which hydrogenation catalyst comprises a megaporous structure, wherein the megaporous structure comprises a porosity of at least 60% by volume and at least 30 volume % of the pore volume of the megaporous structure is present in megapores having a diameter of equal to or more than 1 micrometer; an acid catalyst; a liquid medium; and a source of hydrogen.

Such an additional acid catalyst may be any acid catalyst known in the art to be suitable for liquefying of cellulosic material. Preferably, such an additional acid catalyst is a homogeneous or finely dispersed heterogeneous catalyst, most preferably the additional acid catalyst is a homogeneous catalyst. Preferably, the acid catalyst is a mineral or organic acid or a mixture thereof, preferably a mineral and/or organic acid having a pKa value below about 3.75 or a mixture thereof. Examples of suitable mineral acids include sulphuric acid, para-toluene sulphonic acid, nitric acid, hydrochloric acid and phosphoric acid, and mixtures thereof.

Examples of suitable organic acids which may be used in the process of the invention include oxalic acid, formic acid, lactic acid, citric acid, trichloracetic acid and any mixture thereof.

Preferably the additional acid catalyst is present in an amount of from about 1% to about 10% by weight, preferably from about 2% to about 5% by weight, based on the weight of liquid medium and additional acid catalyst.

In certain embodiments, preferably more than or equal to about 50% by weight, more preferably more than or equal to about 60% by weight and most preferably more than or equal to about 70% by weight of the cellulosic material may advantageously be liquefied into liquefied product, preferably in less than about 3 hours.

From a liquefied product, a product containing one or more monomeric compounds and/or one or more oligomeric compounds can be obtained. For example, when a liquefied product contains monomeric compounds, oligomeric compounds and excess water produced in the liquefaction, monomeric and/or oligomeric compounds and excess water may be separated via distillation or another suitable separation technique.

In one embodiment, a liquefied product may contain one or more monomeric compounds and/or one or more oligomeric compounds. Preferably a liquefied product contains in the range from about 20 to 80 wt %, more preferably in the range of about 25 to 75 wt %, of one or more monomeric compounds having a molecular weight (Mw) of less than or equal to about 250 Dalton (Da); and/or in the range from about 20 to 80 wt %, more preferably in the range of about 25 to 75 wt %, of one or more oligomeric compounds having a molecular weight (Mw) of more than about 250 Dalton (Da) (wt % is an abbreviation for percentage by weight). More preferably from the liquefied product a product consists essentially of about 20 to 80 wt %, more preferably about 25 to 75 wt %, of one or more monomeric compounds having a molecular weight (Mw) of less than or equal to about 250 Dalton (Da); and about 20 to 80 wt %, more preferably about 25 to 75 wt %, of one or more oligomeric compounds having a molecular weight (Mw) of more than about 250 Dalton (Da).

Advantageously, at least part of a liquefied product may be converted in one or more steps to a fuel component or a fuel component precursor. Such conversion may be carried out in any manner known to be suitable for that purpose.

Hence, certain embodiments provide a process for producing a biofuel component from a cellulosic material, which process comprises: (a) a liquefaction process according to an embodiment described herein to produce a liquefied product; (b) converting at least part of the liquefied product to produce a fuel component and/or fuel component precursor; and (c) using the fuel component and/or the fuel component precursor in the preparation of a fuel.

The fuel component or fuel component precursor can be used in the preparation of a biofuel such as a biodiesel, biokerosine or biogasoline.

Certain embodiments further provide a biofuel or biofuel component obtainable by an embodiment of a process for producing a biofuel component from a cellulosic material.

Throughout the description and claims of this specification, the words "comprise" and "contain" and variations of the words, for example "comprising" and "comprises", mean "including but not limited to", and do not exclude other moieties, additives, components, integers or steps.

Certain exemplary embodiments will now be further illustrated by means of the following non-limiting examples.

EXAMPLES

Reaction Procedure

Birch wood (BW) hydroliquefaction experiments were performed in 240 milliliters (mL) batch autoclaves made of Hastelloy® C22 and equipped with an electrical heating, a turbine stirrer, manometer, temperature recording and a sampling-tube. The autoclaves were further equipped with a glass insert with glass baffles and, optionally, catalyst holders. The catalyst holder consisted of either vertical baskets made of glass wires to contain catalyst extrudates or consisted of flat glass sheets with 1×1 centimeter (cm) holes to hold the foam blocks or packed Carbon-sheets vertically. Birch wood chips were milled to smaller than 1 mm sized particles and dried at 105° C. overnight to reach a final moisture content is less than 5 wt %.

In a typical experiment the reactor was loaded with water (63 grams), acetic acid (26 grams), phosphoric acid (1 grams), birch wood (10 grams) and supported Ruthenium (Ru) catalyst (0.15 to 0.3 grams of Ru). The reactor was closed and pressurized to 40 bar (4.0 MegaPascal) with hydrogen gas ($H_2$). This pressure was maintained for 15 minutes (min.) to check for leaks. Subsequently the autoclave was heated in 45 min. to the reaction temperature (220 degrees C.), after which the $H_2$ pressure was adjusted to 80 bar (8.0 MegaPascal). Hydroliquefaction was run for 30 min. while the pressure dropped by 10 to 20 bar (1.0 to 2.0 MegaPascal) as a result of $H_2$ consumption. The hydroliquefaction was stopped by rapidly reducing the temperature to less than 20° C. and, subsequently, venting the hydrogen-rich gas phase. The reactor was opened and emptied with careful removal of liquid and solid residues for further product work up. The solid residue was isolated by filtration over a P3 glass filter (16 to 40 micrometer (μm)), washed with acetone and dried overnight at 50 degrees C. under 100 to 150 mbar (10 to 15 KiloPascal). The char was determined by weighing the solid residue, optionally after subtracting the weight of catalyst mixed with the char in the case of slurried catalysts. The filtrate was analyzed by Size Exclusion Chromatography (SEC) using refractive index (RI) detectors and Ultraviolet (UV, 254 nanometer (nm) wave length) and Gas Chromatography (GC). The acetone-rich wash liquor was occasionally analyzed by SEC and/or subjected to vacuum evaporation to deliver a tar fraction. The degree of liquefaction is then defined as "100-tar-char". The $H_2$ consumption was determined by measuring the intake of hydrogen using a mass flow controller and determining the unconverted hydrogen by the residual pressure measured at room temperature (about 20 degrees C.) after the reaction.

Comparative Examples 1 and 2

Catalysts were prepared by incipient impregnation of zirconia ($ZrO_2$) extrudates with 4.4 wt % of Ru and subsequent calcinations at 450° C. Catalysts extrudates were either evaluated as such (1.6 diameter and about 1 cm long) or after crushing and sieving to 30 to 80 mesh (0.2 to 0.6 millimeter (mm)). The $ZrO_2$ support exhibited a BET surface area of about 55 square meters per gram (m2/g), pore volume of 0.23 milliliter per gram (mL/g) and an average pore diameter of 17 nanometer (nm).

An experiment with crushed $Ru/ZrO_2$ particles that are freely suspended in the liquid medium resulted in good liquefaction of the wood as indicated by a low char yield (5%) and a high $H_2$ consumptions (2%) as indicated in Table 1, run 1. The tar yield was not determined.

Full extrudates that are immobilized in glass baskets to avoid milling during the reaction (table 1, run 2) showed a higher char yield (10%), a high tar yield (34%) a low $H_2$ consumption of about 1 wt %, whereas the degree of liquefaction amounted to 56 wt %. This confirms the poor catalytic performance of extrudates compared to crushed particles, despite the higher Ru loading applied in this experiment (0.28 versus 0.15 wt %). However, the extrudates were easily recovered and separated from the liquid product.

Example 3 and 4 (According to Certain Embodiments of the Invention)

In these examples use was made of $ZrO_2$-foams. The Zirconia ($ZrO_2$) foams consisted of partially-stabilized zirconia foams (Selee PSZ 11906) with pore densities of respectively 30 and 60 pores per inch (ppi) that were purchased from Selee Co. (Hendersonville, N.C., USA). They consisted of rectangular blocks of 5×1×1 cm.

The 60 ppi foams showed a porosity of about 87% by volume, while the 30 ppi foams showed a porosity of about 89% by volume. Based on pore volume, porosity and density of the foam, the 60 ppi foam could be estimated to have at least about 82 volume % of its pore volume present in megapores having a diameter of equal to or more than 1 micrometer. The 30 ppi foam could be estimated to have at least about 85 volume % of its pore volume present in megapores having a diameter of equal to or more than 1 micrometer. The average diameter of the megapores in the 30 ppi foam was estimated to amount to about 0.186 mm (about 186 micrometer) and the average diameter of the megapores in the 60 ppi foam was estimated to amount to about 0.085 mm (about 85 micrometer).

A zirconia wash coat containing 10 wt % Lantanum Oxide ($La_2O_3$) was deposited onto the foam via a single, double or triple dip into the Zr-precursor solution and subsequent drying and firing. The resulting wash coat loading, porosity and estimated BET surface area are reported in Table 1 below. The BET reported below is estimated assuming a BET of 50 m$^2$/g of $ZrO_2$ wash coat.

TABLE 1

| Wash coat: | | None | Single | Double | Triple |
|---|---|---|---|---|---|
| 60 ppi | | | | | |
| Porosity | vol. % | 87 | 86 | 85 | 84 |
| Wash coat | wt % | 0 | 8 | 15 | 24 |
| BET | m²/g | nd | 3.8 | 7.5 | 11.8 |
| BET | m²/mL | nd | 0.7 | 1.59 | 2.4 |
| 30 ppi | | | | | |
| Porosity | vol. % | 89 | 89 | 88 | 88 |
| Wash coat | wt % | 0 | 3 | 7 | 10 |
| BET | m²/g | nd | 1.6 | 3.3 | 5.2 |
| BET | m²/mL | nd | 0.3 | 0.7 | 1.0 | nd = not determined

Several of the triple dipped samples (30 and 60 ppi) were then impregnated with a Ru-nitrosylnitrate solution in nitric acid (10.7 wt % Ru) and subsequently centrifuged, dried at 120° C. and calcined at 350° C. for 0.5 hour which resulted in a Ru loading of 8 to 9 wt % of the wash coat, which corresponded to an overall average Ru loading of about 1 and about 1.5 wt % Ru, based on total foam weight, for the 30 and 60 ppi samples, respectively.

Example 5 (According to Certain Embodiments of the Invention)

In this example, use is made of graphite sheets. The graphite sheets consisted of 'Mellacarbon EX-CFC' corrugated sheets that are available from Sulzer Chemtech Ltd (Winterthur, Switzerland). These sheets were produced from Carbon Fiber-Reinforced Carbon material called "SIGRABOND" (SIGRABOND is a trademark). The sheets were cut in strips of 1×5×0.15 cm which had a typical weight of 0.22 gram (g), a porosity of 85 volume %, and a BET surface area of 115 to 120 m²/g. The strips were dipped in a Ru-nitrosylnitrate solution in nitric acid (10.7 wt % Ru) and subsequently centrifuged, dried at 120° C. and calcined at 350° C. for 0.5 hour, which resulted in a Ru loading of about 2.75 wt %.

Results of Examples 1 to 5

Four 60 ppi foam slabs were tested at 0.14 wt % Ru loading and showed good liquefaction performance, with high $H_2$ consumption (2.5 wt %) and low char and tar yield (5 and 24 wt %, respectively). This corresponds to a degree of liquefaction of 71 wt %. It should be noted that the foam slaps are likely not fully immersed in the reaction medium during the reaction; they are immersed for only about 50% upon start-up, without agitation. Hence, the effective Ru loading is likely lower than reported above. At the end of the experiment, the catalyst was easily separated from the liquid product removing the catalyst holder and could be washed with acetone and subsequently reloaded in the autoclave for a second run.

Due to its lower BET surface area, four 30 ppi foam slabs were evaluated at much lower Ru loading of 0.06 wt %. It nevertheless performed better then the extrudated catalyst (run 2) with 4-fold higher Ru loading as indicated by a higher $H_2$ consumption (1.34 vs. 1.1 wt %) and lower char and tar yields (8 vs. 10 wt % and 29 vs. 34 wt %), i.e. a higher degree of liquefaction of 63 wt %. As for run 3, the catalyst was easily separated from the liquid product.

A run was performed using four stacks of 4 corrugated graphite fiber sheets. Despites the low overall Ru loading of 0.1 wt %, the Carbon-sheets showed a good $H_2$ consumption (1.8 wt %) and moderate char+tar formation (16 wt %) after only 25 min. run, which corresponds to a degree of liquefaction of 84 wt %. It should be noticed that the char was not washed in the case such that it also contained the tar. The liquefaction results obtained are shown in Table 2.

TABLE 2

Hydroliquefaction with supported Ru-catalysts (250 mL autoclave; 10 wt % birch wood, 1 wt % $H_3PO_4$, about 0.15 wt % Ru as Ru/ZrO$_2$, 30 wt % acetic acid (AA) in water at 220° C., 8.0 MPa $H_2$, 50-60 min.)

| Exp. No. | Catalyst | Ru wt % | $H_2$ cons. wt % | Char wt % | Tar wt % | degree of liquefaction wt % |
|---|---|---|---|---|---|---|
| 1 | Free powder | 0.15 | 2.13 | 5 | nd | nd |
| 2 | Immobilised extrudates | 0.28 | 1.1 | 10 | 34 | 56 |
| 3 | Foam-60 ppi | 0.14 [c] | 2.5 | 5 | 24 | 71 |
| 4 | Foam-30 ppi | 0.06 [c] | 1.34 | 8 | 29 | 63 |
| 5 | C-sheets[a] | 0.10 [c] | 1.8 | 16-x[b] | x[b] | 84 |

[a] run for 25 minutes (min.) only;
[b] yield of char + tar;
[c] effective Ru loading about 50% lower than reported since the catalyst were only half immersed in the liquid
nd = not determined Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

The invention claimed is:

1. A process comprising:
   contacting a cellulosic material with a hydrogenation catalyst, a liquid medium; and a source of hydrogen;
   wherein the hydrogenation catalyst comprises a hydrogenating metal or precursor thereof and a megaporous structure,
   wherein the megaporous structure comprises a porosity of at least 60% by volume; and wherein at least 30 volume % of the pore volume comprises a plurality of pores having a diameter of equal to or more than 1 micrometer.

2. The process of claim 1 wherein the contacting step comprises:
   contacting said cellulosic material in said liquid medium with said hydrogenation catalyst in a fixed bed.

3. The process of claim 1, wherein the megaporous structure is a monolithic foam or honeycomb.

4. The process of claim 1, wherein the hydrogenation catalyst comprises a hydrogenating metal and/or precursor thereof carried on a graphite sheet having a porosity of at least 60% by volume and at least 30 volume % of the pore volume comprises a plurality of pores having a pore size of at least 1 micrometer.

5. The process of claim 1, wherein the hydrogenation metal is selected from the group consisting of iron, cobalt, nickel, copper ruthenium, rhodium, palladium, iridium, platinum, gold, and any combination thereof.

6. The process of claim 1, wherein the megaporous structure comprises an inorganic metal oxide.

7. The process of claim 1, wherein at least 50 volume % of the pore volume of the megaporous structure comprises a plurality of pores having a diameter of equal to or more than 1 micrometer.

8. The process of claim 1, wherein at least 90 volume % of the pore volume of the megaporous structure comprises a plurality of pores having a diameter of equal to or more than 1 micrometer.

9. The process of claim 1, wherein the hydrogenation catalyst further comprises a non-megaporous catalytic layer with equal to or more than 70 volume % of the pore volume comprising a plurality of pores having a diameter of less than 1 micrometer.

10. The process of claim 9 wherein the non-megaporous catalytic layer comprises a mesoporous layer.

11. The process of claim 9, wherein the non-megaporous catalytic layer is deposited onto the megaporous structure.

12. The process of claim 9, wherein the non-megaporous catalytic layer comprises the hydrogenating metal and/or precursor thereof.

13. The process of claim 1 further comprising contacting the cellulosic material with an additional catalyst.

14. The process of claim 13 wherein the additional catalyst comprises an acid catalyst.

15. A process for producing a biofuel component comprising:
(a) contacting a cellulosic material with a hydrogenation catalyst, a liquid medium, and a source of hydrogen; to produce a liquefied product;
wherein the hydrogenation catalyst comprises a hydrogenating metal or precursor thereof and a megaporous structure, wherein the megaporous structure comprises a porosity of at least 60% by volume and at least 30 volume % of the pore volume has a diameter of equal to or more than 1 micrometer;
(b) converting at least part of the liquefied product to a fuel component and/or fuel component precursor; and
(c) using at least a portion of the fuel component and/or the fuel component precursor in the preparation of a fuel.

16. The process of claim 15 further comprises contacting said cellulosic material in said liquid medium with said hydrogenation catalyst in a fixed bed.

17. The process of claim 15, wherein the fuel is a biodiesel, a biokerosene, or a biogasoline.

18. A biofuel component produced by the process of claim 15.

* * * * *